March 29, 1960 A. CAMERINI 2,930,878
APPARATUS FOR THE TRANSVERSE CUTTING OF FILMS, TAPES, OR THE
LIKE, OF THERMOPLASTIC MATERIAL
Filed Oct. 17, 1957

United States Patent Office 2,930,878
Patented Mar. 29, 1960

2,930,878

APPARATUS FOR THE TRANSVERSE CUTTING OF FILMS, TAPES, OR THE LIKE, OF THERMOPLASTIC MATERIAL

Aldo Camerini, Terni, Italy, assignor to Montecatini, Societa Generale per l'Industrie Mineraria e Chimica, a corporation of Italy Application October 17, 1957, Serial No. 690,776

Claims priority, application Italy October 19, 1956

6 Claims. (Cl. 219—19)

The present invention relates to the transverse cutting of films, tapes, or sheets of thermoplastic materials. Such films are generally wound on bobbins. It is necessary to cut the film transversely when films of a prefixed length are to be wound up, or when irregular or torn or broken pieces of film must be eliminated. The film must also be cut at the beginning of the winding-up operation when the machine has been started. The film must then be cut and transferred onto the winding bobbin.

These cuts must be carried out with the greatest precision and regularity or uniformity, in order to prevent the film from being wound up on the bobbin with irregular wrinkles. These would be repeated in the successive layers of the wound film. The thinner the thickness of the film the greater is this effect. On the other hand, the cutting operation must be such that it results in a sharp cut. This is necessary in order to reduce the waste of material, which would occur if the cut required repetition. The transverse cutting of films has been carried out manually with a knife, or by a machine employing a shear. In the manual system irregularities and wrinkles always occur. The shear operation is more expensive, in respect to the apparatus needed, and involves a significant degree of danger.

An object of the present invention is to develop a simple, effective and extremely economical device and method for the transverse cutting of plastic films. Other specific objects will be obvious from the following description.

The preferred embodiment of the invention is characterized by a cutting member heated by an electric current having a suitable intensity. The current acts on said member only for a short period of time preceding and comprising the moment of cutting or of contacting the same member with the film. The apparatus comprises a mechanical system consisting of a fixed part and of a mobile part for actuating the cutting member and for carrying it back again to its rest position. It further comprises means controlled by said mechanical system for feeding in and automatically switching off the electric current which is only temporarily passed through the cutting member.

The cutting member comprises a thin conductor or resistor wire which is rotated into contact with the film. The wire therefore is maintained parallel to its initial position. The wire is heated to red heat only in the final part of its advancement to the film surface. At the moment of parting the film the displacement of the wire with respect to the film is translational only, in the preferred form. As described below, the radius of rotation of the wire, about an axis parallel thereto, is only slightly greater than the distance from said axis to the surface of the film.

The mechanical system comprises a carrier part supporting a mobile framework with which the actuating means and the automatic means for the current feeding and commutation are operatively associated.

Other aspects and details of the invention will appear from the following description, the invention being illustrated with reference to the accompanying drawings in which.

Figure 1:
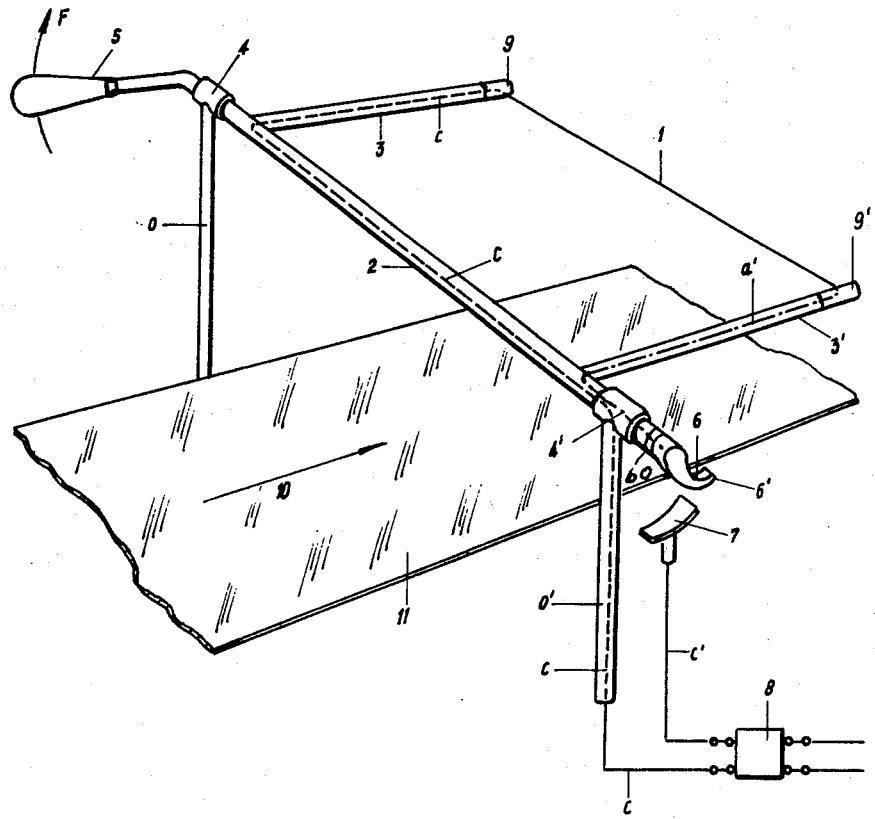
Fig. 1 is a perspective view of the entire cutting device.

In Fig. 1 the film 11 is shown winding on, or unwinding from, suitable collecting or feeding rolls (not illustrated in this figure), at a suitable speed, in the direction of arrow 10. The device employed for the transverse, fine cutting of film 11, is a small vertical frame, positioned normal to the longitudinal axis of film 11, comprising two fixed vertical rods O—O'. The rods support the cross-member 2 in two journal boxes, or pivot providing members, 4—4'.

The cross-member is fitted with two projecting parallel arms 3 and 3' which are of the same length and support, at their free ends, two insulators 9—9'. The latter carry the conductor wire 1, parallelly to the cross-member 2. The distance between the arms 3 and 3' is greater than the width of film 11. The distance from wire 1 to the axis of member 2 is slightly greater than the distance between member 2 and the film. Cross-member 2 can rotate about its axis and is provided, at its left end, with an arm 5, normal to cross-member 2 and lying in the plane formed by the other two arms 3 and 3'. At the other end the revolving cross-member 2 carries fixed thereto a mobile electric contact 6, which has a special shape and is opposite a fixed contact 7. Contact 7 is connected directly with one of the secondary winding terminals of the input transformer 8, through conductor C'. Contact 6 is insulatively joined to tube 2 through an insulator ring or plug 60, the conductor a' passing through the plug to contactor 6.

A second insulated conductor C, passing inside the rod O', the cross-member 2, and arm 3, connects the other secondary winding terminal of transformer 8 with the end of resistor 1 which is fixed on insulator 9. The end of the resistor 1 supported by 9' is electrically fed by conductor lead C' and insulated current conductor a' (inside 3'), when the mobile contact 6 is closed upon fixed contact 7.

The device is operated as follows. When a cutting operation is to be carried out, arm 5 is rotated in the direction of arrow F, so that cross-member 2 revolves in the same direction. By increasing the angle of rotation, the head 6' of contact 6 is caused to approach the fixed contact 7. Contact between 6' and 7 occurs at an angular position in advance of that at which the resistor 1 touches the film 11, preferably so chosen that fine wire 1 is heated to the red before it touches the film. Under this contact, the film will be cut squarely across, with precision and uniformity.

The contour of 6' is therefore so shaped, in correlation with the rotational speed of cross-member 2 and the electric characteristic of the sharp-edged cutting conductor 1 and of the electric current source 8, that the closure of contacts at 6'—7 occurs at a distance between 1 and sheet 11 such that wire 1 can reach the desired cutting temperature. This takes place during the very short run which separates live wire 1 from 11. In this way the resistor is heated for a minimum time and the entire device is extremely economical and safe. It will be noted that only wire 1 need be exposed. Contacts 6 and 7 can obviously be enclosed in a box.

When the handle of arm 5 is released, the mobile frame 2, 3, 3'—1 automatically returns to its equilibrium position and opens the contact 6—7 during its reverse run during said return. A suitable limit stop (not shown in the figure) may be placed at its starting position as shown in Fig. 1. Obviously, arm 5 can be power driven, and suitable conventional automatic starting and stopping mechanism can be provided.

According to another feature of the invention, for the cutting of thermoplastic films which have a tendency to adhere to the hot wire, the resistor can be coated with a thin layer of polytetrafluoroethylene.

Figure 2:
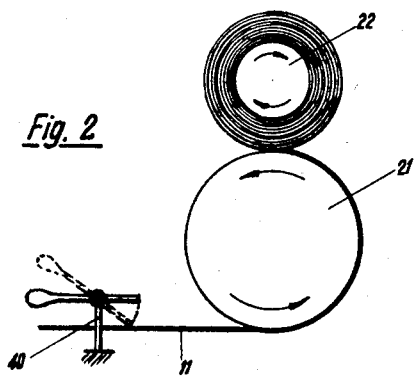
Figs. 2 and 3 are two front, schematic views of two possible arrangements of the cutting device.
Figure 3:
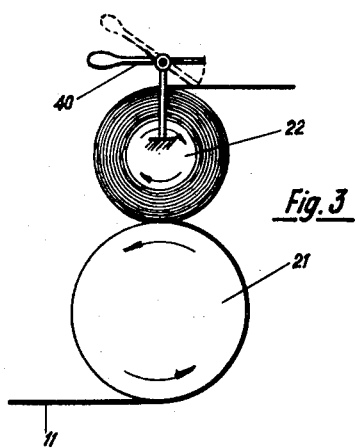

In Figs. 2 and 3, 21 represents the roller which determines the collecting speed, 22 is the roll on which film 11 is wound, while the cutting device according to Fig. 1 is schematically indicated at 40.

In Fig. 2 the cutting device 40 is placed after roller 21; this arrangement is particularly useful when the film is to be cut to remove an irregular or broken portion in order to exclude it from the winding operation. In Fig. 3, device 40 is placed before or adjacent roll 22 on which the film is wound, and is useful for cutting the film at the beginning of the winding.

As a non-limitative example, very square and precise cuts are obtained on thermoplastic films, such as polyethylene terephthalate, polyethylene, or polypropylene, of any thickness, such as from 0.004 to 0.2 mm., by employing a nickel-chromium conductor wire with a diameter of 0.9 mm. and a length of 100 cm. (for 80 cm. wide films). The voltage applied across the wire was 15 to 20 volts.

Although it is preferred to keep the current on in the wire at the moment of cutting, it is within the scope of the invention to design the contacts so that the current is off at the very moment of, or just prior to, or just after, contact with the film.

This invention is not limited to the specific embodiment described. It can be modified in various ways obvious to persons skilled in the art, particularly in respect to the shape and the arrangement of the mobile contact 6, the shape and arrangement of arms 5, 3 and 3' and cross-member 2, the form or the width of film 11, and the way or direction in which it is advanced.

I claim:

1. A hot-wire apparatus for transversely severing a thin sheet of organo-plastic material, comprising a transverse severing resistor wire, a framework having a transverse cross-member and two opposite support arms carried by the cross-member, the severing wire being carried by the arms transversely of the sheet, means for pivotedly supporting the cross-member, means for pivoting the arms to advance the wire to and through the sheet parallelly to the surface thereof, the radius of rotation of the wire being only slightly greater than the distance of the pivot axis of the said rotation to the sheet, whereby the direction of movement of the wire as it causes parting of the sheet is predominantly tangential to the sheet, roll means for collecting the sheet of material and for moving the sheet in a direction opposite said direction of movement of the wire as the wire causes parting of the sheet, electric circuit means for passing heating current through the wire during a limited period initiated at a predetermined time during the advancing of the wire and prior to the contacting of the sheet by the wire, said time being determined so as to permit the wire to reach a predetermined sheet-severing temperature, said circuit means including a first electric contact element pivoting conjointly with the arms and a second stationary opposed contact element with which said first contact element makes electric connection only during a predetermined portion of the movement of the wire.

2. An apparatus for transversely severing a longitudinally extending plastic film, comprising a hollow cross-member rotatable about its axis which axis is normal to the longitudinal axis of the film and parallel to the surface of the film, means including a hollow stationary member for supporting the rotatable hollow cross-member with its axis at a fixed distance from the film, said supporting means including pivot means carrying the cross-member, two hollow carrying arms fixed to and carried by the cross-member and each extending parallelly and generally longitudinally of the film, the two hollow carrying arms being spaced apart sufficiently to pass the longitudinal edges of the film, a transverse film-severing resistor wire carried by the two hollow carrying arms at points thereon, in parallelism with the rotational axis of the cross-member, the wire being insulated from the said arms, means for turning the cross-member on the pivot means to advance the wire through the film, electric circuit means for passing heating current through the wire momentarily during a limited period initiated at a predetermined time during the advancing of the wire and prior to the contacting of the sheet by the wire, said time being determined so as to permit the wire to reach a predetermined sheet-severing temperature in time to sever the film, said circuit means including a first electric contact element, pivoting conjointly with the cross-member, and a second opposed contact element with which said first contact element makes electric connection only during a predetermined portion of the movement of the wire, and connecting wiring inside the hollow cross-member, the hollow stationary member, and the two hollow carrying arms to carry electric current through the contactors to the resistor wire.

3. A hot-wire apparatus for transversely severing a sheet of organo-plastic material, comprising a transverse severing resistor wire, a framework having a transverse cross-member and two opposite support arms carried by the cross-member, the severing wire being carried by the arms transversely of the sheet, means for pivotedly supporting the cross-member, means for pivoting the arms to advance the wire to and through the sheet, electric circuit means for passing heating current through the wire during a limited period initiated at a predetermined time during the advancing of the wire and prior to the contacting of the sheet by the wire, said time being determined so as to permit the wire to reach a predetermined sheet-severing temperature, said circuit means including a first electric contact element pivoting conjointly with the arms and a second stationary opposed contact element with which said first contact element makes electric connection only during a predetermined portion of the movement of the wire, one end of the severing wire being electrically connected to a current supply, the other end being electrically connected to the first electric contact element, the shape of the said contact elements being such that the closure of the two contacts, and the passage of current through the wire, occur only after the cross-member has been turned through a wide angle advancing the wire toward the film to be cut, the passage of current being automatically stopped during the continued motion of the wire after the severing action.

4. An apparatus for parting a thin sheet of thermoplastic material, the apparatus comprising means for moving said sheet of material in a given direction, a parting device comprising a resistor cutting element, a pivoted structure for supporting the resistor cutting element parallelly to the surface of the sheet and for rotating it, so supported, to advance it to the sheet to part the latter, the radius of rotation of the wire being only slightly greater than the distance of the pivot axis of the said rotation to the sheet whereby the direction of movement of the wire as it causes parting of the sheet is predominantly tangential to the sheet, said direction being opposite to the said given direction of movement of the sheet, electric circuit means comprising contactors which connect with each other to pass heating current through the element only during a limited period initiated at a predetermined time prior to the parting of the sheet by the resistor element.

5. A hot-wire apparatus for transversely severing a thin sheet of thermoplastic material, comprising means for moving said sheet of material in a given direction, a transverse severing resistor wire, a framework having a transverse cross-member and two opposite support arms carried by the cross-member, the severing wire being carried by the arms transversely of the sheet, means for pivotedly supporting the cross-member, means for pivoting the arms to advance the wire to the sheet parallelly to the surface thereof, the radius of rotation of the wire being only slightly greater than the distance of the pivot axis of the said rotation to the sheet whereby the direction of movement of the wire as it causes parting of the sheet is predominantly tangential to the sheet, said direction being opposite to the said given direction of movement of the sheet, electric circuit means for passing heating current through the wire during a limited period initiated at a predetermined time during the advancing of the wire and prior to the contacting of the sheet by the wire, said time being determined so as to permit the wire to reach a predetermined sheet-severing temperature, said circuit means including a first electric contact element pivoting conjointly with the arms and a second stationary opposed contact element with which said first contact element makes electric connection only during a predetermined portion of the movement of the wire.

6. A method of cutting a moving thin film of thermoplastic material comprising imparting displacement to a hot electroconductor strand to advance it to and generally parallel to the surface of the film, the strand being momentarily heated up to film-severing temperature only immediately prior to contact with the film by passing a momentary, heating-up, electric current therethrough sufficient therefor, the strand moving in a direction predominantly tangential to the plane of the film at the moment of contact therewith, the moving film being fed in the direction opposite to said direction of movement of the strand.

References Cited in the file of this patent

UNITED STATES PATENTS

| | | |
|---|---|---|
| 2,101,913 | Meyer | Dec. 14, 1937 |
| 2,255,709 | MacDonell | Sept. 9, 1941 |
| 2,356,179 | Proudman et al. | Aug. 22, 1944 |
| 2,422,772 | Bohn | June 24, 1947 |
| 2,673,358 | Silva | Mar. 30, 1954 |
| 2,697,162 | Quandt | Dec. 14, 1954 |
| 2,788,427 | Fresone et al. | Apr. 9, 1957 |
| 2,789,199 | Bjorksten | Apr. 16, 1957 |
| 2,796,914 | Park | June 25, 1957 |